(12) United States Patent
Granboulan et al.

(10) Patent No.: US 12,413,965 B2
(45) Date of Patent: Sep. 9, 2025

(54) METHOD FOR MANAGING ENCRYPTION BY A TRANSMITTING ENTITY IN A 3GPP MCS NETWORK

(71) Applicant: AIRBUS DS SLC, Elancourt (FR)

(72) Inventors: Louis Granboulan, Elancourt (FR);
Olivier Paterour, Elancourt (FR);
François Piroard, Elancourt (FR)

(73) Assignee: AIRBUS DS SLC, Elancourt (FR)

( * ) Notice: Subject to any disclaimer, the term of this patent is extended or adjusted under 35 U.S.C. 154(b) by 307 days.

(21) Appl. No.: 18/180,556

(22) Filed: Mar. 8, 2023

(65) Prior Publication Data
US 2023/0292113 A1    Sep. 14, 2023

(51) Int. Cl.
*H04W 12/04* (2021.01)
*H04L 9/08* (2006.01)
*H04W 12/03* (2021.01)

(52) U.S. Cl.
CPC ........... *H04W 12/04* (2013.01); *H04L 9/0833* (2013.01); *H04W 12/03* (2021.01)

(58) Field of Classification Search
CPC ....... H04W 12/04; H04W 12/03; H04W 4/90; H04W 12/61; H04W 12/76; H04W 12/041; H04W 4/10; H04W 12/0431; H04W 76/50; H04L 9/0833; H04L 65/4038; H04L 652/4061
USPC ......................................................... 455/410
See application file for complete search history.

(56) References Cited

U.S. PATENT DOCUMENTS

| | | | | |
|---|---|---|---|---|
| 10,389,691 | B2 * | 8/2019 | Zhu | H04W 12/041 |
| 2003/0070092 | A1 * | 4/2003 | Hawkes | H04L 9/0891 |
| | | | | 726/4 |
| 2016/0127893 | A1 * | 5/2016 | Mizikovsky | H04L 63/062 |
| | | | | 455/410 |
| 2019/0159025 | A1 * | 5/2019 | Ben Henda | H04W 36/385 |
| 2021/0051005 | A1 * | 2/2021 | Kunz | H04W 12/04 |
| 2021/0058771 | A1 * | 2/2021 | Wu | H04L 9/0861 |
| 2021/0392468 | A1 | 12/2021 | Gundur et al. | |

(Continued)

FOREIGN PATENT DOCUMENTS

WO    WO 2017/124425 A1    7/2017

OTHER PUBLICATIONS

European search opinion dated Jul. 19, 2023 for EP 23160681 original and English machine translation (Year: 2023).*

(Continued)

*Primary Examiner* — Juan A Torres
(74) *Attorney, Agent, or Firm* — Pillsbury Winthrop Shaw Pittman LLP (57) ABSTRACT

A method implemented by a client transmitting entity included in a network according to the 3GPP MCS standard, the client transmitting entity being configured to transmit content intended for a client receiving entity included in the network and being affiliated with a same communication group, the method including selecting a security context from among: a security context with endpoint diversity formed by: a long master key identifier formed by the GMK-ID and the DMK-ID, or a short master key identifier formed by the GMK-ID or a short master key identifier formed by the GUK-ID or no master key identifier. A security context without endpoint diversity formed by: a short master key identifier formed by the GMK-ID or no master key identifier.

7 Claims, 4 Drawing Sheets

(56) References Cited

U.S. PATENT DOCUMENTS

2023/0292111 A1* 9/2023 Granboulan ............ H04W 4/10

OTHER PUBLICATIONS

Reply to Written Opinion prepared by the EPO dated Mar. 12, 2024 for EP 23160681 original and English machine translation (Year: 2024).*
Notification dated Jan. 25 2025 for FR3133511 French original and English machine translation (Year: 2025).*
Search Report as issued in French Patent Application No. FR2201993, dated Oct. 20, 2022.
"3rd Generation Partnership Project; Technical Specification Group Services and System Aspects; Security of the Mission Critical (MC) service; (Release 17)", 3GPP Standard; Technical Specification; 3GPP TS 33.180, 3rd Generation Partnership Project (3GPP), vol. SA WG3, No. V17.5.0 Dec. 23, 2021 (Dec. 23, 2021), pp. 1-204, XP052083357, Retrieved from the Internet: URL:https://ftp.3gpp.org/Specs/archive/33_series/33.180/33180-h50.zip 33180-h50.doc, [Retrieved on Dec. 21, 2022].

* cited by examiner

METHOD FOR MANAGING ENCRYPTION BY A TRANSMITTING ENTITY IN A 3GPP MCS NETWORK

CROSS-REFERENCE TO RELATED APPLICATIONS

This application claims priority to French Patent Application No. 2201993, filed Mar. 8, 2022, the entire content of which is incorporated herein by reference in its entirety.

TECHNICAL FIELD OF THE INVENTION

The technical field of the invention is that of telecommunications.

The present invention relates to a method for managing encryption by a transmitting entity in a 3GPP MCS network, and in particular for managing cases not provided for by the standard.

TECHNOLOGICAL BACKGROUND OF THE INVENTION

The PMR (Professional Mobile Radio) radiocommunication standards TETRAPOL®, TETRA® or P25® allow the implementation of secure professional networks. These narrowband networks are national or local area networks: they are implemented for example within an organisation such as a company, within a country for example for the communications of firemen, police forces, the military etc.

These networks are evolving to support broadband exchanges. The 3GPP standard governing mobile networks of the "GSM" (Global System for Mobile Communications) type, and more particularly in deployments resorting to critical communications services defined by the 3GPP, called "MCS" (for Mission Critical Service), allows for these secure broadband exchanges.

The encryption of voice media MCPTT (Mission Critical Push To Talk) or video MCVideo in a group communication is defined in the TS 33.180 technical specification. It especially implements endpoint diversity.

Any Mission Critical service defined by the 3GPP MCS standard, such as MCVideo, MCData and MCPTT, will hereafter be referred to as "MCX". A "client" and a server are devices comprising at least a processor and a memory, the memory comprising instructions which, when executed by the processor, cause the user device to perform at least the actions assigned to it. Preferably, a client is a user device. In the same way, a "server" may be a user device. An "MCX client" and an "MCX server" are thus user devices configured to implement Mission Critical services.

When transmitting media from an MCX client, the media transmitted may be encrypted in a transmitter-independent manner. In such a case, the concept of "endpoint diversity" is not implemented. Instead, the implementation of endpoint diversity requires the encryption of the transmitted media by a key specific to the transmitting MCX client. For this, the MCX ID of the user of the transmitting MCX client is used to generate a Group User Key Identifier (GUK-ID). This GUK-ID is used to:
- encrypt a media of the SRTP (Secure Real-time Protocol) flow transmitted by the transmitting MCX client and decrypt this SRTP media flow by the receiving MCX clients.

Procedures in TS 33.180 (clause 7.4.2) technical specification require the transmitting MCX client to include this GUK-ID in a 64-bit SRTP MKI«Master Key 1.0 Identifier-»field transmitted with each SRTP packet. The long format (64-bit) Master Key Identifier MKI actually comprises a Group Master Key Identifier (GMK-ID) concatenated with the Group User Key Identifier GUK-ID. To create the security association of the communication group within which the media is exchanged, a Group Master Key (GMK) and its associated identifier (GMK-ID) are distributed to the MCX clients of the group by a Group Management Server (GMS).

This procedure also provides the possibility, when the user identity of the transmitting MCX client (which identity is also referred to as "User salt") is known to the receiving MCX clients, to reduce the SRTP MKI to 32 bits by omitting its GUK-ID component from the transmitter, that is by comprising only the group master key identifier GMK-ID. The GUK-ID group user key identifier is then calculated locally by the receiving MCX clients by performing an XOR "exclusive OR" operation between the user identity of the known transmitting MCX client ("user salt") and the GMK-ID group master key identifier. In the same way, the group master key identifier GMK-ID can be calculated from the group user key identifier GUK-ID and the known user identity of the transmitting MCX client ("User salt"). However, the identity of the transmitting MCX client user cannot be obtained from the group master key ID GMK-identifier and the group user key identifier GUK-ID, in order to keep some confidentiality.

The identity of the user of the transmitting MCX client can be obtained as it is included in the speech control messages in MCPTT voice service, so-called "Floor Control" messages. In MCVideo video service, this information is obtained as it is included in so-called "transmission control" messages. In the MCData data service, there is no endpoint diversity in the 3GPP specifications. In MCData service, however, it is possible to retrieve the user identity of the transmitting MCX client from the payload of SIP and/or HTTP messages. SIP is a known Session Initiation Protocol and HTTP (HyperText Transfer Protocol) communication protocol. In MCData, this payload is end-to-end encrypted but without endpoint diversity.

In the 3GPP MCS standard, only the transmitting MCX client determines which MKI format (32 bit or 64 bit) it uses. Its user identity is transmitted in all call requests and in all floor requests and transmission control requests.

The transmitting MCX client may therefore legitimately consider that its user identity is transmitted end-to-end and choose to save bandwidth (from 5 to 10% for MCPTT voice depending on the header compression used) by using the reduced MKI format (32 bits) not including its GUK-ID, considering that the receiving MCX clients will be able to recalculate it locally using its user identity retrieved from the floor control, transmission control or SIP messages in MCData.

However, there are cases where the user identity of the transmitting MCX client may not be known to all or some of the receiving MCX clients, preventing them from being able to decrypt the information received, without the knowledge of the transmitting MCX client:
Because in accordance with procedures of the TS 24.380 ("media plane" MCPTT) and 24.581 ("media plane" MCVideo) technical specifications, the media controller server of the group within which users are communicating considers that there is a need for privacy and that the identity of the user to which the right to transmit is granted should not be made known to the other participants, or Because in accordance with the procedures of TS 24.380 and TS 24.581 technical specifications for clustered groups, the identity of the user requesting the right to transmit is masked to the media controller server of the clustered group by the media controller server of the constituent group (called "Non-controlling server"), the constituent group being the communication group belonging to the group cluster and to which the user device of the user requesting the right to transmit is affiliated, Because in the case of system interconnection, the identity of the users of one of the systems may be considered sensitive and masked by an MCX gateway server in charge of filtering such sensitive information in messages exchanged between systems that do not fully trust each other. In such a context, the range of the communication group (intra or inter system) is not necessarily known to the members of the group.

In accordance with 3GPP TS 33.180 technical specification, there is a need to encrypt media in the communication group using endpoint diversity. This is only valid for voice media (MCPTT) and video media (MCVideo) but not for MCData payload, as there is no endpoint diversity in the 3GPP MCS specification for MCData.

As described previously, since the identity of the user of the transmitting MCX client may not always be known to the other participants, for example for privacy reasons, in cases of interconnection of systems in different trusted domains, or in cases of group clusters, there are currently cases in which the receiving MCX clients cannot decrypt the received media, regardless of whether it is a voice media (MCPTT), or video media (MCVideo). The confidentiality requirement of the transmitting MCX client can be determined at any level, for example per call, per user, per group, per organisation, per system or per country, which complicates the task of identifying, in a network, actors and/or actions that may be involved in hiding identity of the user of the transmitting MCX client.

There is therefore a need to be able to ensure, in a 3GPP MCS network, that a receiving MCX client can decrypt encrypted content transmitted by a transmitting MCX client.

SUMMARY OF THE INVENTION

The invention provides a solution to the problems discussed above, by enabling a transmitting client in a 3GPP MCS network to choose the encryption it applies to a content transmitted so that a receiving client can actually decrypt the content transmitted.

One aspect of the invention relates to a method implemented by a client transmitting entity included in a 3GPP MCS (3rd Generation Partnership Program Mission Critical Services) standard network, the client transmitting entity being configured to transmit content intended for a client receiving entity included in the network, the client transmitting entity and the client receiving entity being affiliated with a same communication group, the method comprising at least one step of selecting, by the client transmitting entity from at least one piece of security context information stored in the memory of the transmitting entity, a security context among the following security contexts:

A security context with endpoint diversity, the security context being formed by:
  A long master key identifier MKI formed by a group master key identifier GMK-ID and a group user key identifier GUK-ID, the group master key identifier GMK-ID being specific to the communication group, the group user key identifier GUK-ID being specific to a user of the transmitting entity, or
  a short Master Key Identifier MKI formed by the Group Master Key Identifier GMK-ID or
  A short master key identifier MKI formed by the group user key identifier GUK-ID or
  No master key identifier MKI.

A security context without endpoint diversity, where the security context is formed by:
  A short master key identifier MKI formed by the Group Master Key Identifier GMK-ID or
  No master key identifier MKI.

By virtue of the invention, it is ensured that the receiving entity of content transmitted and encrypted by a transmitting entity is able to decrypt the content. For this, the invention comprises selecting a security context according to information stored in the memory of the transmitting entity. Thus, the transmitting entity has the knowledge of the environment in which it is transmitting the encrypted content and the security context comprises information necessary for the receiving entity to decrypt the content. Furthermore, the security context can be used to adapt encryption of the content and allows dynamic selection of encryption in contrast to the 3GPP MCS standard currently in TS 33.180 technical specification. The invention allows the transmitting entity to use or not use endpoint diversity, in contrast to the 3GPP MCS standard currently in the TS 33.180 technical specification, thus saving bandwidth by not having to transmit the group user key identifier GUK-ID in the master key identifier MKI.

The inventors have also noticed that the group master key identifier GMK-ID sometimes does not need to be transmitted, as the receiving entity can determine which group master key identifier GMK-ID has been used from the group master key identifiers GMK-ID it already stores, for that communication group within which it receives the encrypted content or for all communication groups with which it is affiliated. Without the invention, it is not possible to implement this type of case, in which the master key identifier MKI does not need to be transmitted with the encrypted content, as it is not provided for by the 3GPP MCS standard, and as there is no mechanism to do so. The presence of security context information in the memory of the transmitting entity allows selection of a security context to implement this type of case.

By virtue of the invention, network bandwidth is not unnecessarily used, by transmitting only the information necessary for the receiving entity to decrypt the content, and all necessary information is sent for the receiving entity to decrypt the content.

In cases where the identity of the user of the transmitting entity is not known to the receiving entity, a security context with a short master key identifier MKI including the group user key identifier GUK-ID may be selected, as the receiving entity can then determine the correct group master key identifier GMK-ID by testing the different group master key identifiers GMK-ID stored by it and thus decrypt the content by virtue of the master key comprised of the group user key identifier GUK-ID received and the group master key identifier GMK-ID determined, without having to use the identity of the user of the transmitting entity.

Further to the characteristics just discussed in the preceding paragraphs, the method according to one aspect of the invention may have one or more additional characteristics among the following, considered individually or according to any technically possible combinations:

the method further comprises the steps of:
Encrypting the content, the content being encrypted by the client transmitting entity, encrypting the content being based on a master key according to the Secure Real Time Protocol (SRTP), the master key being obtained:
If the security context is with endpoint diversity, from the group master key identifier (GMK-ID) and the group user key identifier (GUK-ID),
If the security context is without endpoint diversity, from the Group Master Key Identifier (GMK-ID),
Transmitting a frame to the receiving entity, according to the SRTP protocol, the frame including the content encrypted and the security context.
The information stored in the memory of the transmitting entity is a set of parameters comprising the following parameters:
Endpoint diversity parameter comprising information on whether or not to implement endpoint diversity,
Transmission parameter of the group master key identifier (GMK-ID) comprising information on whether or not to transmit the group master key identifier (GMK-ID),
Transmission parameter of the group user key identifier (GUK-ID) comprising information on whether or not to transmit the group user key identifier (GUK-ID),
and in that the security context is constructed from the set of parameters.
the communication group is an MCPTT, MCVideo or MCData group.
the security context information is received from a remote entity prior to the security context selection step.
the group master key identifier GMK-ID is obtainable from the group user key identifier GUK-ID and an identity of the user of the transmitting entity, and the group user key identifier GUK-ID is obtainable from the group master key identifier GMK-ID and an identity of the user of the transmitting entity.

Another aspect of the invention relates to a communication network according to the 3GPP MCS "3rd Generation Partnership Program Mission-Critical System" standard, the communication network comprising at least:
a client transmitting entity configured to implement the method according to the invention,
a client receiving entity configured to receive the content encrypted and security context transmitted by the transmitting entity.

The invention and its different applications will be better understood upon reading the following description and upon examining the accompanying figures.

BRIEF DESCRIPTION OF THE FIGURES

The figures are set forth by way of illustrating and in no way limiting purposes of the invention.

DETAILED DESCRIPTION

Unless otherwise specified, a same element appearing in different FIGS. has a unique reference.

Figure 1:
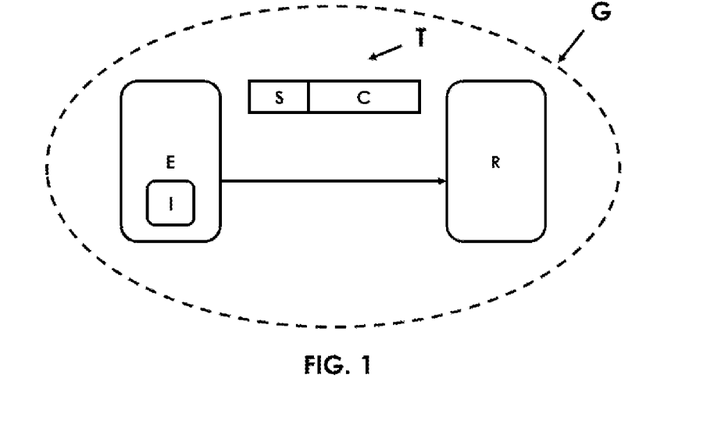
FIG. 1 shows a schematic representation of a network comprising entities configured to implement the method according to the invention.

FIG. 1 shows a schematic representation of a network comprising entities configured to implement the method according to the invention.

In particular, the network represented in FIG. 1 comprises a transmitting entity E configured to implement the method according to the invention, and a receiving entity R.

The network represented in FIG. 1 is a network according to the 3GPP MCS standard, that is it is implemented following the specifications defined by the 3GPP MCS standard.

Figure 3:
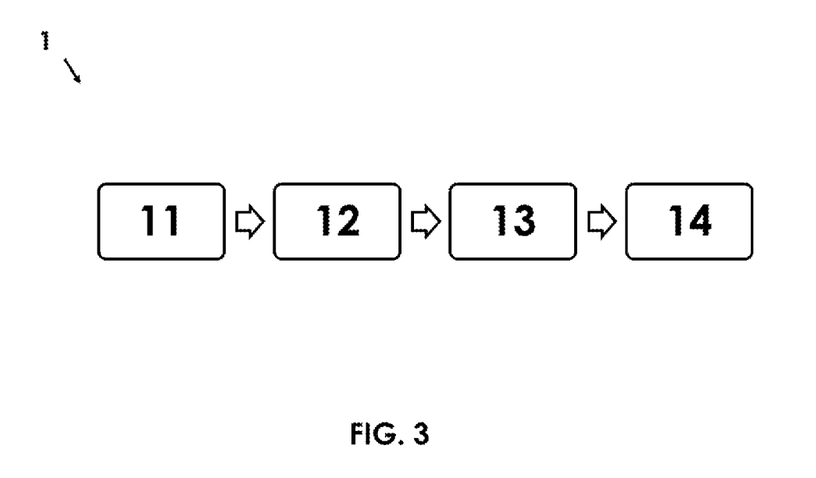
FIG. 3 shows a schematic representation of a method according to the invention.

FIG. 3 shows a schematic representation of the method according to the invention. The method represented in FIG. 3 is a method for managing encryption according to the invention within the network of FIG. 1.

The network of FIG. 1 comprises a communication group G. The transmitting entity E is affiliated with the communication group G. The receiving entity R is also affiliated with the same communication group G. The communication group G is an MCPTT, MCVideo or MCData communication group as defined in the state of the art.

The transmitting entity E and the receiving entity R may be client or server, participant or non-participant, entities or any other entity defined by the 3GPP MCS standard. The transmitting entity E and the receiving entity R are devices comprising at least a processor and a memory, the memory comprising instructions which, when executed by the processor, cause the processor to implement an action assigned to the entity. For example, the entities may be user devices such as mobile phones, tablets, computers, or any other device usable by a user, or may be computers or devices having the role of a server for the purpose of the 3GPP MCS standard.

The method 1 according to the invention represented in FIG. 3 allows the transmitting entity E to select an appropriate security context S with regard to the network in which it operates. For this, the transmitting entity E stores at least one piece of security context information I, on the basis of which it performs step of selecting a security context S, the selection step 12 being included in the method 1 according to the invention represented in FIG. 3.

The security context information I is stored in the memory (not represented) of the transmitting entity E. This information may optionally have been received, in a reception step 11 included in the method 1 according to the invention represented in FIG. 3. This reception step 11 may comprise receiving, via the 3GPP MCS network, the information I having been sent by a remote entity, for example by a server, or by a client entity controlled by a user, for example by an administrator having knowledge of the 3GPP MCS network. This information I has preferably been created by the administrator having knowledge of the 3GPP MCS network and its specificities, in order to have subsequently a security context selection S at step 12 of the method 1 as appropriate as possible with respect to the network topology and context.

Figure 4:
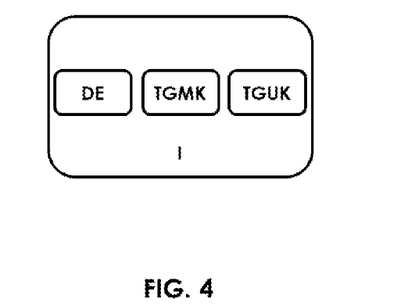
FIG. 4 shows a schematic representation of a transmitting entity configured to implement the method according to the invention.

In a preferred embodiment schematically represented in FIG. 4, the security context information I comprises a set of parameters. This set of parameters preferably comprises the following three parameters:
Endpoint diversity parameter DE comprising a piece of information on whether or not to implement endpoint diversity,
Transmission parameter TGMK of the Group Master Key Identifier GMK-ID comprising a piece of information on whether or not to transmit the Group Master Key Identifier GMK-ID, A transmission parameter TGUK of the group user key identifier GUK-ID including a piece of information on whether or not to transmit the group user key identifier GUK-ID.

The invention uses the following key identifiers:

Group user key identifier GUK-ID: This identifier is a key identifier specific to a user of the transmitting entity E and specific to the communication group G. Thus, this key can be seen as a "session key" in the SRTP protocol, as defined in RFC 3711. An identifier of this key, which does not have to remain secret, allows retrieval of this key, which has to remain secret. In the absence of endpoint diversity, this user key is not used to encrypt content in the 3GPP MCS standard.

Group Master Key Identifier GMK-ID: This identifier is a group master key identifier specific to communication group G. In the absence of endpoint diversity, this group master key GMK is used alone to encrypt content in the 3GPP MCS standard, as defined in section 7.5.1 of the TS 33.180 technical specification. In the presence of endpoint diversity, this group master key GMK is used in combination with the group user key GUK to encrypt content as defined in section 7.4.2 of TS 33.180 technical specification.

Master Key Identifier MKI: This identifier is a master key identifier.

Each of the three parameters DE, TGMK and TGUK can be represented in any form, for example as a character string or a boolean. These three parameters have preferably been given a value, that is a "yes" indication or a "no" indication, by a user and preferably again by an administrator of the 3GPP MCS network.

The method 1 according to the invention comprises at least one step 12 of selecting a security context S. This security context S is intended to be transmitted, at a step 14 of the method 1, in the header of a frame T also comprising the content C encrypted, as represented in FIG. 1.

Depending on the endpoint diversity parameter DE, the security context S is selected from one of the following two groups:
A security context S with endpoint diversity or
A security context S without endpoint diversity.

In some cases, it may be desired to dispense with endpoint diversity, which the present invention allows in contrast to the 3GPP MCS standard. Indeed, endpoint diversity does not provide additional security and makes bandwidth optimisation more complex if the identity of the transmitter is not easily obtained.

In the case where a security context S with endpoint diversity is chosen, the parameters of group user key identifier TGUK and group master key identifier TGMK then make it possible to select a security context S formed by:
a long master key identifier MKI formed by the group master key identifier GMK-ID and the group user key identifier GUK-ID if both parameters TGMK and TGUK comprise an indication to use the group master key identifier GMK-ID and the group user key identifier GUK-ID respectively, or
a short master key identifier MKI formed by the group master key identifier GMK-ID if the parameter TGMK comprises an indication to use the group master key identifier GMK-ID and if the parameter TGUK comprises an indication not to use the group user key identifier GUK-ID or
A short master key identifier MKI formed by the group user key identifier GUK-ID if the parameter TGMK comprises an indication not to use the group master key identifier GMK-ID and if the parameter TGUK comprises an indication to use the group user key identifier GUK-ID or
No Master Key Identifier MKI if the TGMK parameter comprises an indication not to use the Group Master Key Identifier GMK-ID and if the TGUK parameter comprises an indication not to use the Group User Key Identifier GUK-ID.

By "Short MKI", it is meant a 32-bit long master key identifier MKI because it only comprises the GUK-ID or the GMK-ID, and by "long MKI", a 64-bit long master key identifier MKI because it comprises the GUK-ID and the GMK-ID.

Figure 2A:
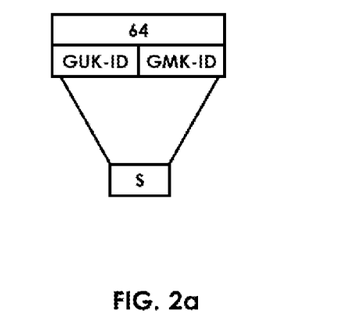
FIGS. 2a to 2d show different schematic representations of selectable security contexts.

In a security context S with endpoint diversity and with long master key identifier MKI, as represented in FIG. 2a, the encryption and decryption method is the default one defined by the 3GPP MCS standard in the TS 33.180 technical specification.

Figure 2B:
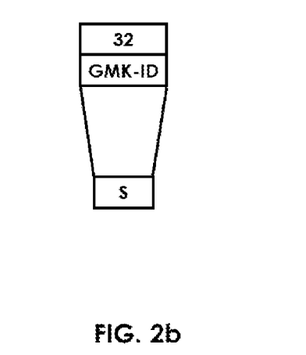

In a security context S with endpoint diversity and short Master Key Identifier MKI comprising the group master key identifier GMK-ID, the case represented in FIG. 2b, the encryption and decryption method is the one defined by the 3GPP MCS standard in the TS 33.180 technical specification where the receiving entity R knows the identity of the user of the transmitting entity E. It is applicable only in cases of MCX configuration ensuring that the identity of the transmitting entity E will be received by all receiving entities of the communication group and is thus the responsibility of the configuration administrator when it is the configuration administrator that determines the parameters included in the security context information I stored in the memory of the transmitting entity E. These parameters may be updated and modified, by a remote entity or by the transmitting entity E itself.

Figure 2C:
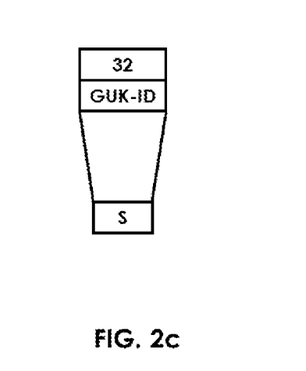

In a security context S with endpoint diversity and with a short master key identifier MKI comprising the group user key identifier GUK-ID, a case not existing in the 3GPP MCS standard and represented in FIG. 2c, the group master key identifier GMK-ID has then to be determined by the receiving entity R. This is achieved by virtue of a step not represented implemented by the receiving entity R after receiving of the frame T. In this step, included in a content transmission method according to the invention implemented by the transmitting entity E and by the receiving entity R and previously comprising the steps of method 1 according to the invention, the group master key identifier GMK-ID is determined by testing all group master keys known to the receiving entity R. Indeed, the encryption mode specified by the TS 33.180 technical specification is AEAD-AES-128-GCM, which checks integrity, and it is therefore not possible for the receiving entity R to mistake the determined group master key GMK because integrity is checked only for the correct group master key GMK. All group master keys GMK associated with the communication group G stored by the receiving entity R or all group master keys GMK stored by the receiving entity R may be tested.

Figure 2D:
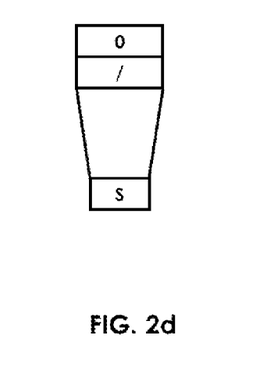

In a security context S with endpoint diversity and without a Master Key Identifier MKI, which does not exist in the 3GPP MCS standard, the security context S which will be included in the frame T is empty (0 bit), as represented in FIG. 2d. The group master key identifier GMK-ID has then to be determined by the receiving entity R. This is achieved by virtue of a step not represented implemented by the receiving entity R after receiving the frame T. In this step, included in a content transmission method according to the invention implemented by the transmitting entity E and by the receiving entity R and previously comprising the steps of the method 1 according to the invention, the group master key identifier GMK-ID is determined by testing all group master keys known to the receiving entity R. Indeed, the encryption mode specified by the TS 33.180 technical specification is AEAD-AES-128-GCM, which checks integrity, and it is therefore not possible for the receiving entity R to mistake the group master key GMK determined. All group master keys GMK associated with the communication group G stored by the receiving entity R or all group master keys GMK stored by the receiving entity R can be tested. Once the group master key identifier GMK-ID is determined, the group user key identifier GUK-ID may be determined based on the identity of the user of the transmitting entity E, as in the state of the art.

In a security context S without endpoint diversity, the security context S may be formed by:
  A short master key identifier MKI formed by the group master key identifier GMK-ID, the case represented in FIG. 2b, or
  No master key identifier MKI, as represented in FIG. 2d.
Indeed, in a security context S without endpoint diversity the group user key identifier is not used to encrypt the content C.

In a security context S without endpoint diversity and without a master key identifier MKI, a case not existing in the 3GPP MCS standard, the group master key identifier GMK-ID has then to be determined by the receiving entity R. This is achieved by virtue of a step not represented implemented by the receiving entity R after receiving the frame T. In this step, included in a content transmission method according to the invention implemented by the transmitting entity E and by the receiving entity R and previously comprising the steps of method 1 according to the invention, the group master key identifier GMK-ID is determined by testing all group master keys known to the receiving entity R. Indeed, the encryption mode specified by the TS 33.180 technical specification is AEAD-AES-128-GCM, which checks integrity, and it is therefore not possible for the receiving entity R to mistake the determined group master key GMK. All group master keys GMK associated with the communication group G stored by the receiving entity R or all group master keys GMK stored by the receiving entity R may be tested.

The method 1 comprises, after the step 12 of selecting a security context S, a step 13 of encrypting the content C. Encrypting 13 the content C is performed by the transmitting entity E according to the security context S selected in step 12. Indeed, the security context S determines whether endpoint diversity should be used, in which case the encryption should be based on the group user key identifier GUK-ID and the group master key identifier GMK-ID, or whether endpoint diversity should not be used, in which case the encryption should not be based on the group user key identifier GUK-ID and should only be based on the group master key identifier GMK-ID. Encrypting 13 is performed using a master key according to the Secure Real Time Protocol (SRTP) in RFC3711 and according to the technical specification TS 33.180, point 7.5.1. The master key is obtained:
  If the security context is with endpoint diversity, from the group master key identifier GMK-ID and the group user key identifier GUK-ID,
  If the security context is without endpoint diversity, from the group master key identifier GMK-ID.
The method 1 comprises a step 14 of transmitting a frame T according to the SRTP protocol, such a frame T comprising the content C encrypted in step 13 and the security context S selected in step 12. The frame T is then transmitted to the receiving entity R, which uses the information included in the security context S and the information available to it by virtue of the network topology and context to decrypt the content C.

The invention claimed is:

1. A method implemented by a client transmitting entity included in a network according to the 3GPP MCS (3rd Generation Partnership Program Mission Critical Services) standard, the client transmitting entity being configured to transmit content to a client receiving entity included in the network, the client transmitting entity and the client receiving entity being affiliated with a same communication group, the method comprising selecting, by the client transmitting entity on the basis of at least one piece of security context information stored in the memory of the transmitting entity, a security context among the following security contexts:
  a security context with endpoint diversity, the security context being formed by:
    a long master key identifier formed by a group master key identifier and a group user key identifier, the group master key identifier being specific to the communication group, the group user key identifier being specific to a user of the transmitting entity, or
    a short Master Key Identifier formed by the Group Master Key Identifier or
    a short Master Key Identifier formed by the Group User Key Identifier or
    no Master Key Identifier,
  a Security Context without endpoint diversity, where the Security Context is formed by:
    a short Master Key Identifier formed by the Group Master Key Identifier or
    no o master key identifier.

2. The method according to claim 1, further comprising:
  encrypting the content, the content being encrypted by the client transmitting entity, encrypting the content being based on a master key according to the Secure Real Time Protocol, the master key being obtained:
    if the security context is with endpoint diversity, from the group master key identifier and the group user key identifier,
    if the security context is without endpoint diversity, from the group master key identifier,
  transmitting a frame to the receiving entity, according to the SRTP protocol, the frame comprising the content encrypted and the security context.

3. The method according to claim 1, wherein the information stored in memory of the transmitting entity is a set of parameters comprising the following parameters:
  endpoint diversity parameter comprising a piece information on whether or not to implement endpoint diversity,
  transmission parameter of the Group Master Key Identifier including a piece of information on whether or not to transmit the Group Master Key Identifier,
  transmission parameter of the group user key identifier comprising a piece of information on whether or not to transmit the group user key identifier,
and wherein the security context is constructed from the set of parameters.

4. The method according to claim 1, wherein the communication group is an MCPTT, MCVideo or MCData group.

5. The method according to claim 1, wherein the security context information is received from a remote entity prior to of selecting the security context.

6. The method according to claim 1, wherein:
the group master key identifier is obtainable from the group user key identifier and an identity of the user of the transmitting entity and
the group user key identifier is obtainable from the group master key identifier and an identity of the user of the transmitting entity.

7. A communication network according to the 3GPP MCS (3rd Generation Partnership Program Mission-Critical System) standard, the communication network comprising:
a client transmitting entity configured to implement the method according to claim 1,
a client receiving entity configured to receive the content encrypted and security context transmitted by the transmitting entity.

* * * * *

UNITED STATES PATENT AND TRADEMARK OFFICE
CERTIFICATE OF CORRECTION

| | |
|---|---|
| PATENT NO. | : 12,413,965 B2 |
| APPLICATION NO. | : 18/180556 |
| DATED | : September 9, 2025 |
| INVENTOR(S) | : Louis Granboulan et al. |

Page 1 of 1

It is certified that error appears in the above-identified patent and that said Letters Patent is hereby corrected as shown below:

On the Title Page

Item (30), Foreign Application Priority Data, is missing and should read:
Mar. 8, 2022 (FR) ........................... 2201993

Signed and Sealed this
Seventh Day of October, 2025

John A. Squires
*Director of the United States Patent and Trademark Office*